United States Patent
Yasuda et al.

(10) Patent No.: US 7,453,788 B2
(45) Date of Patent: Nov. 18, 2008

(54) OPTICAL HEAD, OPTICAL INFORMATION RECORDING/REPRODUCING APPARATUS, COMPUTER, VIDEO RECORDING/REPRODUCING APPARATUS, VIDEO REPRODUCING APPARATUS, SERVER AND CAR NAVIGATION SYSTEM

(75) Inventors: Akihiro Yasuda, Katano (JP); Yoshiaki Komma, Hirakata (JP); Yasuhiro Tanaka, Ashiya (JP); Yoshiyuki Shimizu, Hirakata (JP)

(73) Assignee: Panasonic Corporation, Osaka (JP)

( * ) Notice: Subject to any disclaimer, the term of this patent is extended or adjusted under 35 U.S.C. 154(b) by 636 days.

(21) Appl. No.: 10/760,853

(22) Filed: Jan. 20, 2004

(65) Prior Publication Data
US 2004/0145997 A1 Jul. 29, 2004

(30) Foreign Application Priority Data
Jan. 22, 2003 (JP) .............................. 2003-013054

(51) Int. Cl.
*G11B 7/135* (2006.01)
(52) U.S. Cl. .......................... 369/112.23; 369/112.24; 359/708; 359/710; 359/718; 359/719
(58) Field of Classification Search ............ 369/112.23, 369/112.24; 359/708, 710, 718, 719
See application file for complete search history.

(56) References Cited

U.S. PATENT DOCUMENTS

| 5,251,060 | A | * | 10/1993 | Uenishi et al. ............... 359/328 |
|---|---|---|---|---|
| 5,420,722 | A | | 5/1995 | Bielak |
| 5,467,335 | A | * | 11/1995 | Braat ..................... 369/112.23 |
| 5,535,058 | A | * | 7/1996 | Tanaka et al. ................ 359/711 |
| 5,608,708 | A | | 3/1997 | Ophey |
| 5,625,402 | A | * | 4/1997 | Sarraf ......................... 347/232 |
| 5,917,660 | A | * | 6/1999 | Ohtaki ......................... 359/710 |
| 6,088,170 | A | | 7/2000 | Lee et al. |
| 6,567,354 | B2 | * | 5/2003 | Yanagawa ................ 369/44.23 |
| 6,721,259 | B1 | * | 4/2004 | Yamamoto et al. ..... 369/112.26 |
| 2001/0010583 | A1 | | 8/2001 | Ando |
| 2002/0089904 | A1 | * | 7/2002 | Takeshita ................. 369/44.23 |

FOREIGN PATENT DOCUMENTS

| DE | 19916573 | 10/2000 |
|---|---|---|
| JP | 59-109021 | 6/1984 |
| JP | 63-118714 | 5/1988 |
| JP | 2002-208159 | 7/2002 |

* cited by examiner

*Primary Examiner*—Wayne R Young
*Assistant Examiner*—LaTanya Bibbins
(74) *Attorney, Agent, or Firm*—Hamre, Schumann, Mueller & Larson, P.C.

(57) ABSTRACT

An optical head is provided that increases the light utilization efficiency and that can be adapted to high-speed recording and double-layer disks. A beam-shaping lens that shapes an elliptical beam emitted from a light source into a substantially circular beam has a pair of cylindrical surfaces that are curved in the same direction. The cylindrical surface that is closer to the light source is an aspherical surface, and the cylindrical surface that is closer to the light source is a spherical surface. Thus, an optical head is obtained, with which aberrations can be kept low, even when the beam-shaping magnifying power is about a factor 2.

35 Claims, 13 Drawing Sheets

OPTICAL HEAD, OPTICAL INFORMATION RECORDING/REPRODUCING APPARATUS, COMPUTER, VIDEO RECORDING/REPRODUCING APPARATUS, VIDEO REPRODUCING APPARATUS, SERVER AND CAR NAVIGATION SYSTEM

FIELD OF THE INVENTION

The present invention relates to optical heads, optical information recording/reproducing apparatuses that record or reproduce information by irradiating light from an optical head onto an optical disk, as well as computers, video recording/reproducing apparatuses, video reproducing apparatuses, servers and car navigation systems using the same.

BACKGROUND OF THE INVENTION

Optical disks known as DVD (Digital Versatile Disks) are available on the market as high-density high-capacity optical information recording media. Such optical disks recently have gained rapidly in popularity as recording media that can record images, music and computer data. In recent years, advances have been made in research in next-generation optical disks that have an even higher recording density. Next-generation optical disks are awaited as recording media that are apt to replace the currently prevalent video tapes of VTR (video tape recorders), and their development is advancing at a tremendous pace.

Optical heads that record or reproduce information onto or from an optical disk are provided with a light source, an objective lens that focuses a beam that is emitted from the light source onto an optical disk, and a detector that detects the beam that is reflected from the optical disk. Semiconductor lasers used for the light source emit a beam from the end face of a thin active layer, so that the shape of the beam is elliptical, and the ratio between the short axis and the long axis of the beam is about 1:3. When recording information onto the optical disk, it is desirable to improve the light utilization efficiency by shaping the elliptical beam into a circular beam.

The following is a description of first to fourth conventional examples of beam shaping.

FIG. 16 shows a first conventional example (see, for example, Laid-Open Utility Model Application S63-118714 (FIGS. 1 and 4)) of adjusting the shape of a beam into a circular shape with a lens, and is a diagrammatic view of an optical head 309 using a beam shaping lens 302. An elliptical divergent beam emitted from the light source 301 is shaped into a circular divergent beam by a later-described beam-shaping lens 302, passes through a beam-splitting prism 303, is collimated into a parallel beam by a collimating lens 304, reflected by a mirror 305, condensed by an objective lens 306, and irradiated onto an optical disk 310. The beam reflected by the optical disk 310 travels back along the reverse path, is reflected by the beam-splitting prism 303, and is detected by a detector 308.

Both faces of the beam-shaping lens 302 are cylindrical surfaces, and the beam is refracted and enlarged along its short axis direction by the cylindrical surfaces, whereas the spread angle is not changed along its long axis direction, so that the elliptical beam is shaped into a circular beam.

FIG. 17 shows a second conventional example (see, for example, Laid-Open Utility Model Application S63-118714 (FIGS. 1 and 4)) using a cylindrical lens 302a and a cylindrical lens 302b that are spatially separated from one another. Also with this configuration, an elliptical beam can be shaped into a circular beam, like in the first conventional example.

FIG. 18 shows a third conventional example (see, for example, Laid-Open Patent Application 2002-208159A (FIG. 1)) of adjusting the shape of the beam into a circular shape with a lens. A first surface 402i and a second surface 402o of a beam-shaping lens 402 are cylindrical surfaces, and the beam is refracted and enlarged along its short axis direction by the cylindrical surfaces, whereas it passes through without changing its spread angle along its long axis direction, thus shaping the beam. The first surface 402i is an aplanatic surface, so that no aberration occurs. The distance on the optical axis from the emission point of the light source 401 to the first surface 402i is the same as the thickness of the beam-shaping lens 402 on the optical axis, so that the beam of the short-axis direction is perpendicularly incident on the second surface 402o, and no aberration occurs. The cross-section of the second surface 402o through the plane that is perpendicular to the center axis of the cylindrical surface (the plane parallel to the paper plane is a non-circular arc and in the following, such a cylindrical surface is referred to as a "aspherical cylindrical surface"). With the second surface 402o as an aspherical cylindrical surface, an axially rotation-symmetric spherical aberration is attained by causing aberrations in the short axis direction that are of the same extent as in the long axis direction. The spherical aberration caused by this beam-shaping lens 402 is eliminated by a collimating lens 404.

FIG. 19 shows a fourth conventional example of shaping a beam into circular shape with a prism, and is a diagrammatic view of an optical head 509 using a beam-shaping prism 502. The divergent beam emitted from the light source 501 is collimated into a parallel beam by a collimating lens 504, and an elliptical beam is shaped into a circular beam by refracting the beam along the beam's short axis direction with a beam-shaping prism 502. The circular beam passes through a beam-splitting prism 503, is reflected by a mirror 505, is condensed by an objective lens 506, and is irradiated onto an optical disk 510. The beam that is reflected by the optical disk 510 travels back the reverse path, is reflected by the beam-splitting prism 503, passes through a detection lens 507, and is detected by a detector 508.

However, with the beam-shaping lens 302 of the first conventional example shown in FIG. 16, the beam-shaping magnifying power is limited approximately to a factor of 1.2. The cross-section of the cylindrical surface of the beam-shaping lens 302 through the plane that is perpendicular to the center axis of the cylindrical surface (the plane parallel to the paper plane in FIG. 16) is a simple substantially circular arc (in the following, such a cylindrical surface is referred to as a "spherical cylindrical surface"). When the beam-shaping magnifying power to attain a substantially circular beam is set to at least a factor of 2 or greater, then higher-order aberrations of at least $0.06\lambda$ (where $\lambda$ is the wavelength) occur due to the spherical cylindrical surface, making it impractical.

Moreover, also with the cylindrical lens 302a and the cylindrical lens 302b of the second conventional example shown in FIG. 17, with the beam-shaping magnifying power set to a factor of 2 or greater, the same higher-order aberrations will occur. Moreover, the cylindrical lens 302a and the cylindrical lens 302b are spatially separated, so that there is the problem that, due to temperature changes, their spacing may change and the beam-shaping magnifying power may change, and the aberrations become worse.

SUMMARY OF THE INVENTION

An optical head according to the present invention includes a light source; a beam-shaping lens shaping an elliptical divergent beam that is emitted from the light source into a substantially circular divergent beam; a collimating lens that converts the substantially circular divergent beam into a substantially parallel beam; an objective lens that focuses the substantially parallel beam onto an optical information recording medium; and a detector that detects a beam that is reflected from the optical information recording medium. The beam-shaping lens has a pair of cylindrical surfaces that are curved in the same direction. One of those cylindrical surfaces is an aspherical surface, and the other one of those cylindrical surfaces is a spherical surface. With this configuration, higher-order aberrations can be kept low and superior recording and reproducing is possible.

It is preferable that the cylindrical surface that is closer to the light source is the aspherical surface, and the cylindrical surface that is further away from the light source is the spherical surface. With this configuration, higher-order aberrations can be kept low and superior recording and reproducing is possible.

It is preferable that a cross-section of the beam-shaping lens perpendicular to the optical axis is of quadrilateral shape. With this configuration, the beam-shaping direction can be set easily.

It is preferable that the beam-shaping lens is made of glass. With this configuration, aberration fluctuations due to temperature changes can be kept small.

It is preferable that the beam-shaping lens is mounted on a base and a location at which the beam-shaping lens is fixed to the base is closer to the light source than a center of the beam-shaping lens. With this configuration, aberration fluctuations due to temperature changes can be kept small.

It is preferable that the beam-shaping lens is adhered to a base at a surface that is perpendicular to center axes of the cylindrical surfaces of the beam-shaping lens. With this configuration, aberration fluctuations due to temperature changes can be kept small.

It is preferable that the beam-shaping lens and a base on which the beam-shaping lens is mounted are pressed together by a spring that exerts pressure in a center axis direction of the cylindrical surfaces of the beam-shaping lens. With this configuration, aberration fluctuations due to temperature changes can be kept small.

It is preferable that the beam-shaping lens is made of two cylindrical lenses, which are joined together. With this configuration, the beam-shaping lens can be manufactured easily.

It is preferable that the two cylindrical lenses have planar surfaces the two cylindrical lenses are joined together. With this configuration the positional adjustment and the rotational adjustment of the two cylindrical lenses become easy.

It is preferable that cross sections perpendicular to the optical axis of the two cylindrical lenses are of different size. With this configuration, the beam-shaping lens easily can be mounted on the base.

It is preferable that the cross section perpendicular to the optical axis of the cylindrical lens that is closer to the light source is larger than that of the cylindrical lens that is further away from the light source. With this configuration, the light source side of the beam-shaping lens can be fixed to the base. That is to say, aberration fluctuations due to temperature changes can be kept small.

It is preferable that the two cylindrical lenses have different thicknesses in an optical axis direction. With this configuration, the positional adjustment of the beam-shaping lens can be carried out reliably.

It is preferable that the thickness in the optical axis direction of the cylindrical lens that is closer to the light source is larger than that of the cylindrical lens that is further away from the light source. With this configuration, the light source side of the beam-shaping lens can be fixed to the base.

It is preferable that the light source and the beam-shaping lens are fixed to the same holder. With this configuration, aberration fluctuations due to temperature changes can be kept small.

It is preferable that the holder has a tilt adjustment mechanism for correcting an optical axis tilt of the light source. With this configuration, aberration fluctuations due to temperature changes can be kept small, and the optical axis tilt of the light source can be corrected.

It is preferable that the holder has a positional adjustment mechanism for correcting a positional error of the light source. With this configuration, aberration fluctuations due to temperature changes can be kept small, and the position of the emission point can be corrected.

It is preferable that the holder is press-fitted into an optical base of the optical head. With this configuration, aberration fluctuations due to temperature changes can be kept small.

It is preferable that the holder is fixed to an optical base of the optical head by caulking. With this configuration, aberration fluctuations due to temperature changes can be kept small.

It is preferable that the holder is welded to an optical base of the optical head. With this configuration, aberration fluctuations due to temperature changes can be kept small.

It is preferable that the collimating lens can be moved in the optical axis direction. With this configuration, spherical aberration can be corrected while keeping costs down.

An optical head according to the present invention includes a light source; a beam-shaping lens shaping an elliptical divergent beam that is emitted from the light source into a substantially circular divergent beam, mounted on a base; a collimating lens that converts the substantially circular divergent beam into a substantially parallel beam; an objective lens that focuses the substantially parallel beam onto an optical information recording medium; and a detector that detects a beam that is reflected from the optical information recording medium. A location at which the beam-shaping lens is fixed to the base is closer to the light source than a center of the beam-shaping lens.

It is preferable that the optical head further includes an adhesive that is applied on the side of the beam-shaping lens that is closer to the light source, in order to adhere the beam-shaping lens to the base.

It is preferable that the optical head further includes an elastic member that presses the beam-shaping lens down on the side of the beam-shaping lens that is closer to the light source.

It is preferable that the base has a protruding shape with respect to the beam-shaping lens on the side that is closer to the light source.

It is preferable that the base has a depressed shape with respect to the beam-shaping lens between the side that is closer to the light source and the side that is further away from the light source.

An optical information recording/reproducing apparatus according to the present invention includes an optical head according to the present invention; a rotation system or a transport system that moves the optical head relative to the optical information recording medium; and a control circuit that controls the optical head and the rotation system or transport system based on signals obtained with the optical head. With this configuration, the recording and reproducing of information an optical information recording medium is possible.

A computer according to the present invention includes an optical information recording/reproducing system according to the present invention as an external storage apparatus. With this configuration, the recording and reproducing of information an optical information recording medium is possible.

A video recording/reproducing apparatus according to the present invention includes an optical information recording/reproducing apparatus according to the present invention and can record or reproduce video images on an optical information recording medium. With this configuration, the recording and reproducing of information an optical information recording medium is possible.

A video reproducing apparatus according to the present invention includes an optical information recording/reproducing apparatus according to the present invention and can reproduce video images from an optical information recording medium. With this configuration, the recording of information an optical information recording medium is possible.

A server according to the present invention includes the optical information recording/reproducing system according to the present invention as an external storage apparatus. With this configuration, the recording and reproducing of information an optical information recording medium is possible.

A car navigation system according to the present invention includes an optical information recording/reproducing system according to the present invention as an external storage apparatus. With this configuration, the recording and reproducing of information an optical information recording medium is possible.

With the present invention, the advantageous effect is attained in which the light utilization efficiency is increased and adaptation to high-speed recording and double-layer disks is possible.

DESCRIPTION OF THE PREFERRED EMBODIMENTS

The following is a description of embodiments of the present invention, with reference to FIGS. 1 to 15. In the following figures, like numerals denote like elements.

Embodiment 1

Figure 1A:
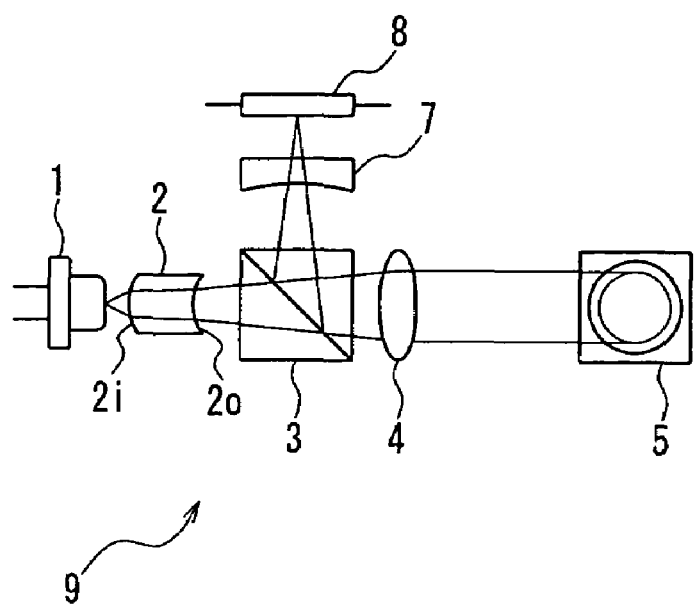
FIG. 1A and FIG. 1B are a diagrammatic view illustrating the configuration of an optical head according to Embodiment 1 of the present invention.
Figure 1B:
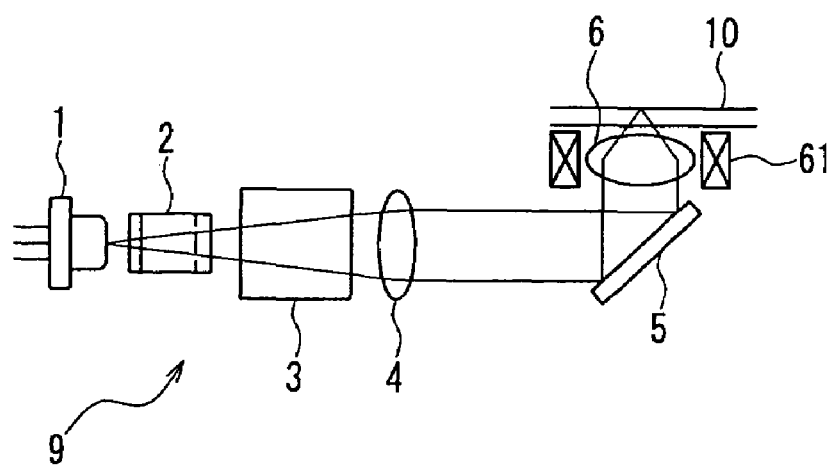

FIGS. 1A and 1B show an optical head 9 according to Embodiment 1 of the present invention. FIG. 1A is a top view of the optical head 9, and FIG. 1B is a lateral view thereof A beam emitted from a light source 1 is emitted from an end face of a thin active layer, so that the shape of the beam is elliptical, and the ratio between the short axis and the long axis of the beam is about 1:3. The elliptical divergent beam emitted from the light source 1 is shaped by a later-described beam-shaping lens 2 into a substantially circular divergent beam, which passes through a beam-splitting prism 3, is collimated by a collimating lens 4 into a substantially parallel beam, is reflected by a mirror 5, condensed by an objective lens 6, and irradiated onto an optical disk 10. The beam that is reflected by the optical disk 10 travels back the reverse path, is reflected by the beam-splitter prism 3, passes through the detection lens 7, and is detected by the detector 8. The objective lens 6 is driven by an objective lens actuator 61 in the focus direction and the tracking direction, based on detection signals obtained with the detector 8.

In the present embodiment, the light source 1, the beam-shaping lens 2, the beam-splitting prism 3, the collimating lens 4, the mirror 5, the detection lens 7, the detector 8 and the objective lens actuator 61 are fixed to a base 16, which is described later.

Figure 2:
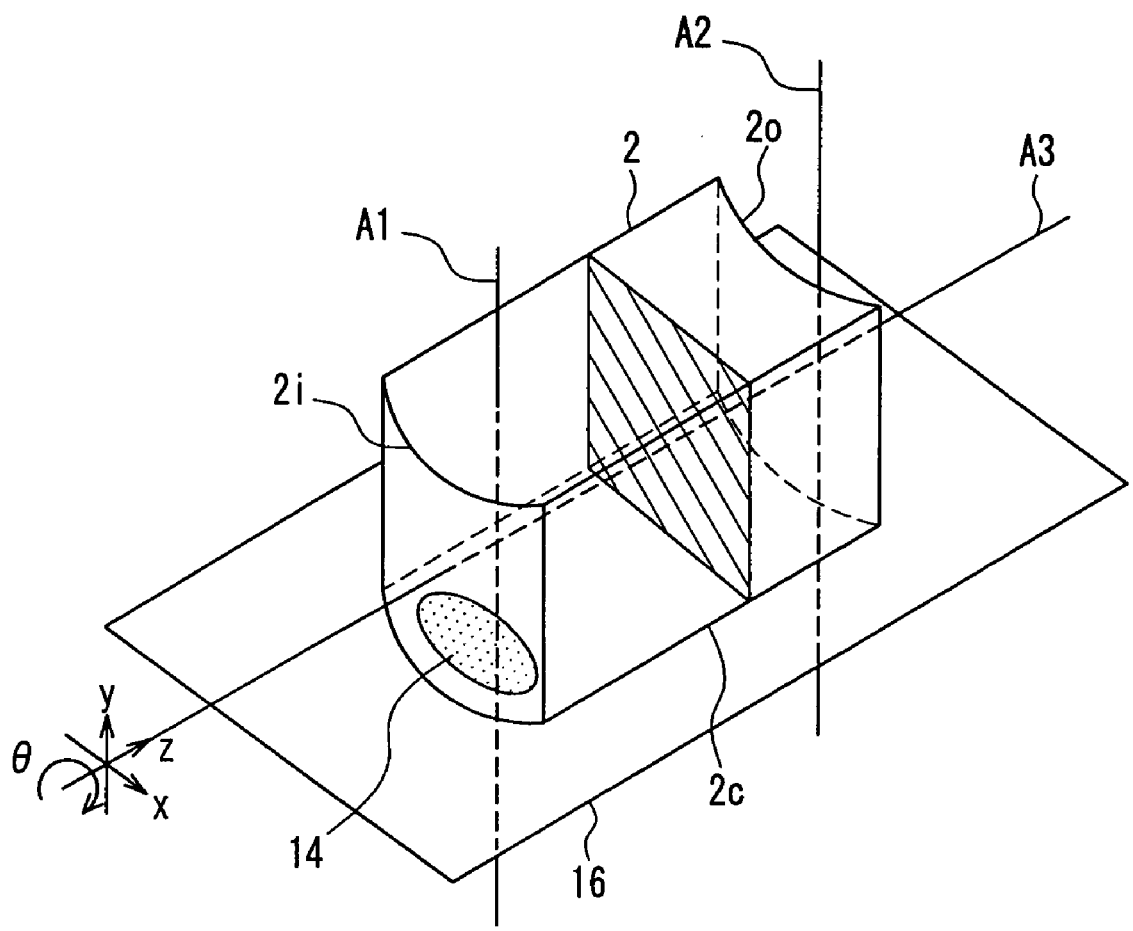
FIG. 2 is a perspective view of a beam-shaping lens according to Embodiment 1 of the present invention.

FIG. 2 is a perspective view of the beam-shaping lens 2 of Embodiment 1 of the present invention. The beam-shaping lens 2 has a pair of cylindrical surfaces that are curved in the same direction. When z represents the direction along the optical axis A3, y represents the center axis direction of the cylindrical surfaces, and x represents the direction perpendicular to z and y, then the cross-section in the xz-plane of the cylindrical surface of the first surface 2i on the side that is closer to the light source 1 forms a non-circular arc (in the following, such a cylindrical surface is referred to as "aspherical cylindrical surface"). Moreover, the cross-section in the xz-plane of the cylindrical surface of the second surface 2o on the side that is further away from the light source 1 forms a simple substantially circular arc (in the following, such a cylindrical surface is referred to as "spherical cylindrical surface"). When an elliptical beam passes through this beam-shaping lens 2, it is refracted and contracted along its long axis direction, as shown in FIG. 1A, whereas the spread angle along the short axis direction does not change, as shown in FIG. 1B, so that the elliptical beam is shaped into a substantially circular beam, and the ratio between short axis and long axis of the elliptical beam of 1:3 is changed to that of the substantially circular beam in a range of 1:1-1:2. Thus, the light utilization efficiency is improved by shaping the beam into substantially circular shape, and the optical power of the spot that is focused onto the optical disk 10 is increased, so that it also can be applied to high-speed recordings or two-layer disks and the like.

Figure 16:
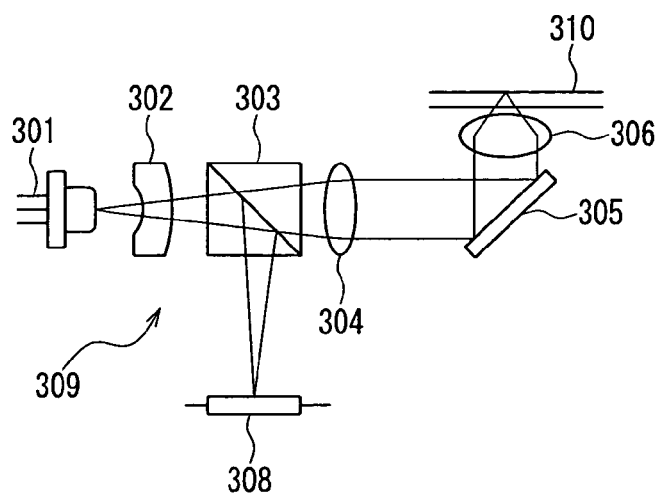
FIG. 16 is a diagrammatic view showing the configuration of an optical head according to a first conventional example.

The difference to the first conventional example that was discussed above with reference to FIG. 16 is that the first surface 2i is an aspherical cylindrical surface. In the first conventional example, no aspherical cylindrical surface is used, so that higher-order aberrations of at least 0.06 λ (where λ represents the wavelength) occur. In this Embodiment 1, not only axial aberrations but also off-axis aberrations are minimized by using an aspherical cylindrical surface, so that higher-order aberrations can be reduced to 0.005 λ or less. Thus, superior recording and reproduction becomes possible.

As for the lens fabrication, high surface precision is easy for the spherical cylindrical surface, because the lens surface can be ground while rotating the lens on a round bar. On the other hand, this is not possible for the aspherical cylindrical surface, so that it is difficult to machine that lens surface with high precision. For this reason, cutting marks and waviness tend to occur on the aspherical cylindrical surface, which tends to worsen aberrations.

Thus, in order achieve satisfactory aberration properties, an aspherical cylindrical lens surface is necessary for the lens design, but a spherical cylindrical surface is preferable for lens fabrication. In Embodiment 1 of the present invention, one surface is an aspherical cylindrical surface, and the other surface is a spherical cylindrical surface. Thus, consideration is given to both the lens design and the lens fabrication,. so that a beam-shaping lens with good aberration properties can be realized.

The beam that is emitted from the light source 1 is a divergent beam, so that the effective diameter of the beam on the first surface 2i is different from that on the second surface 2o. If the aspherical cylindrical surface is taken for the first surface 2i with the smaller effective diameter of the beam, and the spherical cylindrical surface is taken for the second surface 2o with the larger effective diameter of the beam, then the influence of machining errors of the lens is minimized, and there is the effect that even better aberration properties can be attained.

Figure 18:
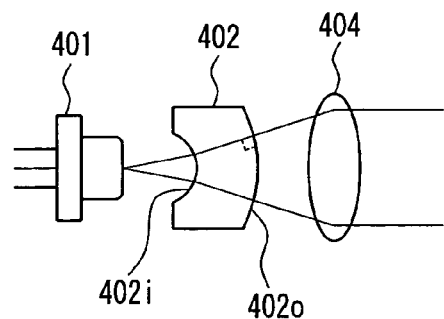
FIG. 18 is a diagrammatic view illustrating a beam-shaping lens according to a third conventional example.

In the third conventional example, which was described with reference to FIG. 18, the first surface 402i was an aplanatic surface, the second surface 402o was an aspherical cylindrical surface, and the distance from the emission point of the light source 401 to the first surface 402i was set to be the same as the thickness of the beam-shaping lens 402, but the Embodiment 1 is entirely different from this. The third conventional example is designed so that no aberrations occur at the first surface 402i and no aberrations occur at the second surface 402o, but the Embodiment 1 of the present invention is different in that the design is such that no aberrations occur when considering the first surface 2i and the second surface 2o in total.

It should be noted that beam shaping by making the first surface 2i convex and the second surface 2o concave and contracting the long axis direction of the beam can make the focal length of the collimating lens 4 longer, so that there is the advantage of increased tolerance for shifts in the light emission point on the light source 1 due to temperature changes. On the other hand, in the case of beam shaping in which the short axis direction of the beam is enlarged, the first surface 2i should be concave and the second surface 2o should be convex. In this case, the focal length of the collimating lens 4 can be shortened, so that there is the advantage that the optical head 9 can be made compact.

As indicated by the hatching in FIG. 2, the cross-sectional shape of the beam-shaping lens 2 through the xy plane (the plane perpendicular to the optical axis A3) is quadrilateral. By making it quadrilateral, the bottom surface 2c of the beam-shaping lens 2 fits smoothly on the base 16 on which the beam-shaping lens 2 is mounted, so that the beam-shaping lens 2 can be placed securely. That is to say, a rotation θ around the z-axis of the beam-shaping lens 2 can be curbed, so that the beam-shaping lens 2 can be positioned easily to set the beam-shaping direction. Moreover, in order to provide the beam-shaping lens 2 with good aberration properties, the beam-shaping lens 2 has to be positioned in the z-direction and x-direction with respect to the light source 1. Since the bottom surface 2c of the beam-shaping lens 2 fits in smooth planar contact on the base 16, there is the advantage that positional adjustments can be performed reliably.

It should be noted that it is also possible to make the cross-sectional shape of the beam-shaping lens 2 circular and to fabricate a flat portion (bottom portion 2c) by cutting.

If a UV-curing adhesive 14 is applied between the bottom surface 2c and the base 16, then the beam-shaping lens 2 can be fixed easily by irradiating UV light after adjusting the position of the beam-shaping lens 2. Ordinarily, adhesives may expand or shrink due to temperature changes. An adhesive 14 that is applied at the xz-plane (the plane perpendicular to the center axes A1 and A2 of the cylindrical surfaces) as shown in FIG. 2 expands or contracts evenly in the x-direction and the z-direction by temperature changes, so that the beam-shaping lens 2 is not shifted in the x-direction or the z-direction. However, when the adhesive 14 expands or contracts in the y-direction due to temperature changes, the beam-shaping lens 2 may shift in the y-direction. However, when the first surface 2i and the second surface 2o shift only in the y-direction, their optical characteristics are not affected at all. Thus, Embodiment 1 of the present invention has the advantage that the optical characteristics are not degraded by environmental changes, such as temperature changes.

Moreover, the optical base on which the optical components are mounted is made of metal or plastic, so that it may expand or contract due to temperature changes. Correspondingly, the distance between the light source 1 and the beam-shaping lens 2 may fluctuate, leading to astigmatism. In Embodiment 1 of the present invention, the location where the beam-shaping lens 2 is fixed by the adhesive 14 is on the side of the light source 1 (closer to the first surface 2i), with respect to the center. Thus, the distance between the light source 1 and the fixing location of the beam-shaping lens 2 is made short, so that expansions and contractions due to temperature changes of the base 16 will be small, and as a result, changes in the distance between the light source 1 and the fixing location of the beam-shaping lens 2 become small compared to the case that the fixing location is closer to the second surface 2o, so that the effect is attained that astigmatic fluctuations will be small.

If the light source 1 emits blue laser light, the beam-shaping lens 2 is made of glass, and the base 16 is made of a metal such as aluminum or zinc, then it is preferable that the distance between the emission point of the light source 1 and the first surface 2i is at least 1 mm and at most 2 mm.

Figure 3A:
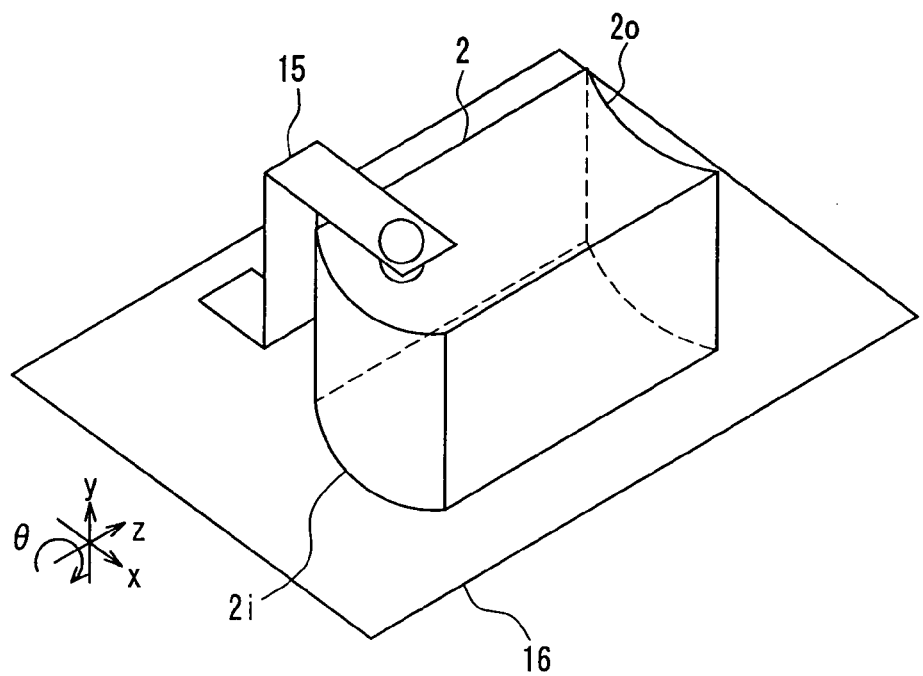
FIG. 3A is a diagram of a spring presser of the beams-shaping lens according to Embodiment 1 of the present invention.

It should be noted that it is also possible to fix the beam-shaping lens 2 along the y-direction (center axis direction of the cylindrical surfaces) by pushing it down with a spring 15, as shown in FIG. 3A. By pushing it down in the y-direction, the beam-shaping lens 2 will not shift in the x-direction or the z-direction even when the base 16 contracts or expands due to temperature changes, and even when the beam-shaping lens 2 shifts in the y-direction, the first surface 2i and the second surface 2o are shifted only in the y-direction, so that there is the advantageous effect that there are no changes in the optical characteristics. Also in this case, if the location at which the beam-shaping lens 2 is pressed down by the spring 15 is on the side of the light source 1 with respect to the center, then the effect is attained that there are few astigmatic fluctuations.

Figure 3B:
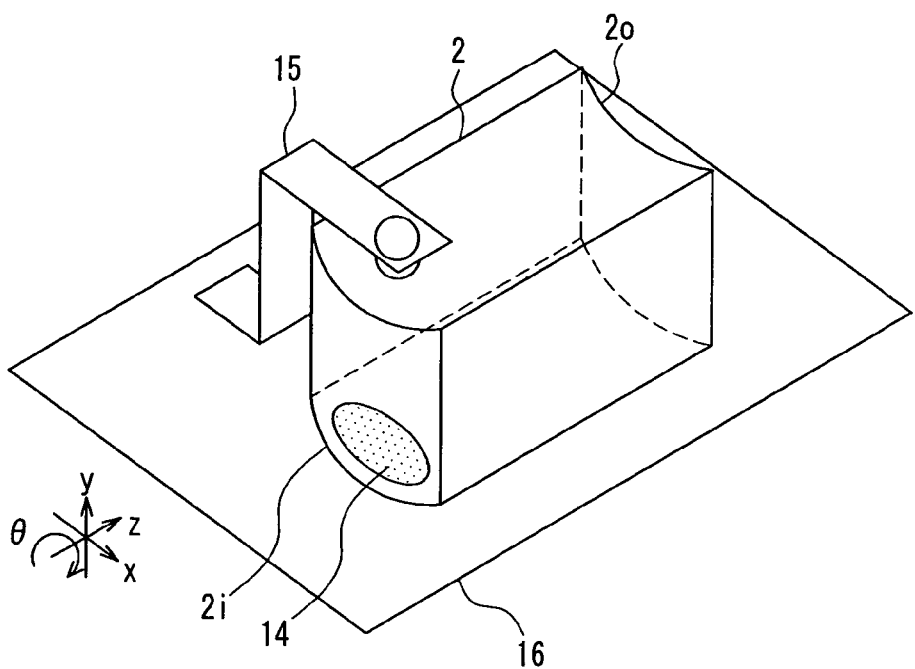
FIG. 3B is a diagram illustrating another spring presser of the beam-shaping lens according to Embodiment 1.
Figure 3C:
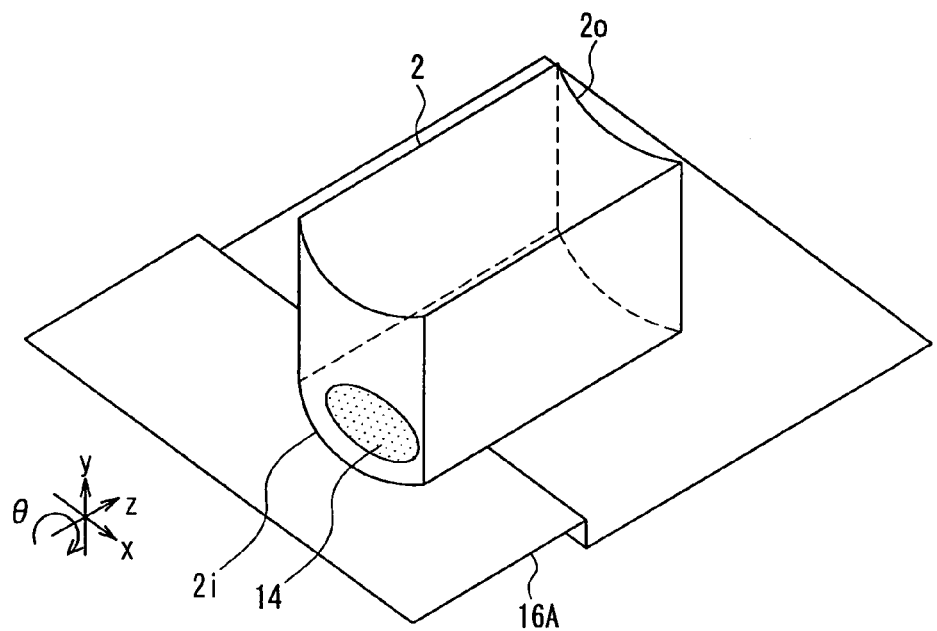
FIG. 3C is a diagram of another base 16A on which the beam-shaping lens according to Embodiment 1 is mounted.
Figure 3D:
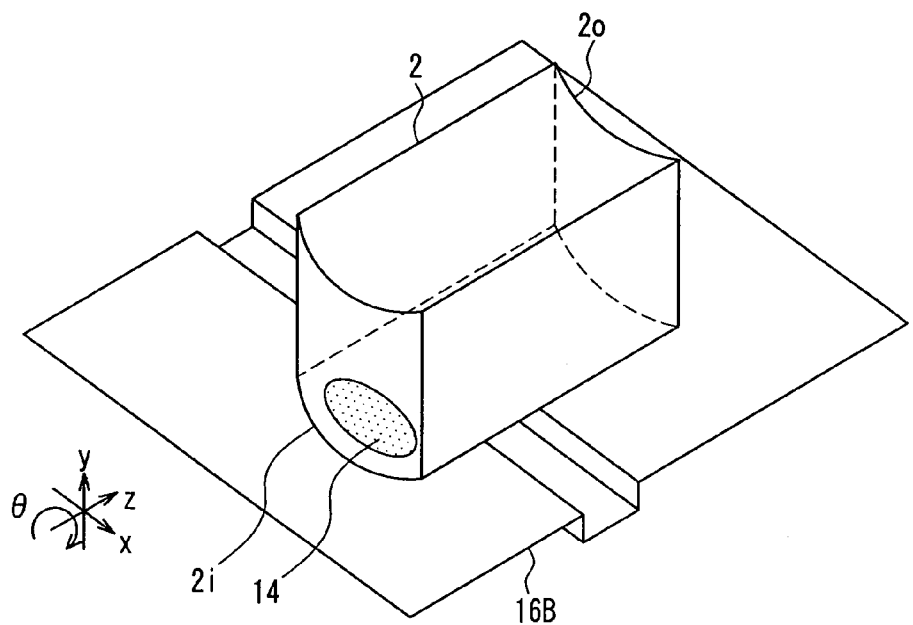
FIG. 3D is a diagrammatic view of still another base on which the beam-shaping lens according to Embodiment 1 is mounted.

Referring to FIGS. 3B to 3D, the following is a description of a preferable embodiment, in which the fixing location of the beam-shaping lens 2 is arranged such that the increase in astigmatism due to temperature changes is reduced.

FIG. 3B is a diagram illustrating another spring presser of the beam-shaping lens according to Embodiment 1. By applying the adhesive 14 for adhering the beam-shaping lens 2 to the base 16 at only the side of the beam-shaping lens 2 that is closer to the light source 1, the fixing location of the beam-shaping lens 2 is arranged on the side closer to the light source 1, and there is the effect that astigmatic fluctuations can be kept small. Moreover, if the beam-shaping lens 2 is pressed down with a spring 15 on the side closer to the light source 1, then increases in astigmatism can be prevented reliably and without variations.

FIG. 3C is a diagrammatic view of another base 16A on which the beam-shaping lens according to Embodiment 1 is mounted. As shown in FIG. 3C, the shape of the base 16A protrudes with respect to the beam-shaping lens 2 on the side closer to the light source. The adhesive 14 for adhering the base 16A to the beam-shaping lens 2 is applied to the portion with this protruding shape. Thus, when the base 16A has this protruding shape with respect to the beam-shaping lens 2, increases in astigmatism can be prevented reliably and without variations.

FIG. 3D is a diagrammatic view of still another base on which the beam-shaping lens according to Embodiment 1 is mounted. As shown in FIG. 3D, the base 16B has a depression, such as a groove, with respect to the beam-shaping lens 2, between the side of the base 16B that is closer to the light source 1 and the side that is further away from the light source 1. When configuring the base 16B like this, the fixing angle of the beam-shaping lens 2 around the x-axis shown in FIG. 3D can be stabilized, and increases in astigmatism can be prevented without variations. If the base 16A and the beam-shaping lens 2 are fixed with an adhesive, then the adhesive 14 should be applied on the side of the base 16B that is closer to the light source 1.

In both of the examples shown in FIGS. 3C and 3D, increases in astigmatism can be prevented more reliably and without variations by pressing down the beam-shaping lens 2 on the side closer to the light source 1 with a spring 15, as explained with reference to FIG. 3B.

In Embodiment 1 of the present invention, the beam-shaping lens 2 is made of glass. The beam-shaping lens 2 itself may also contract or expand due to temperature changes, leading to astigmatism. Glass has a smaller thermal expansion coefficient than plastic, so that it has the advantage that aberration fluctuations due to temperature changes can be kept small.

Embodiment 2

Figure 4A:
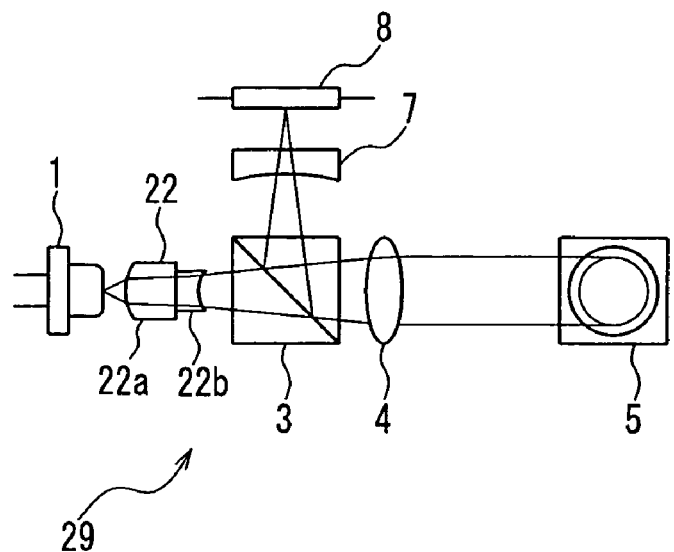
FIG. 4 is a diagrammatic view showing an optical head according to Embodiment 2 of the present invention.
Figure 4B:
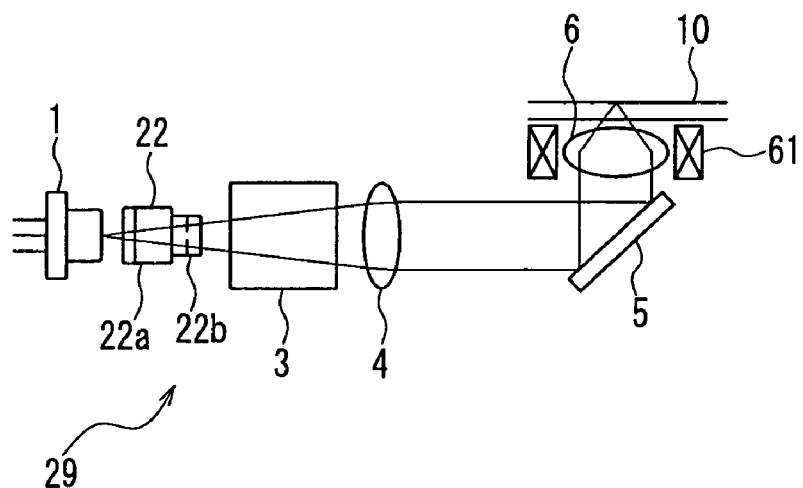
Figure 5:
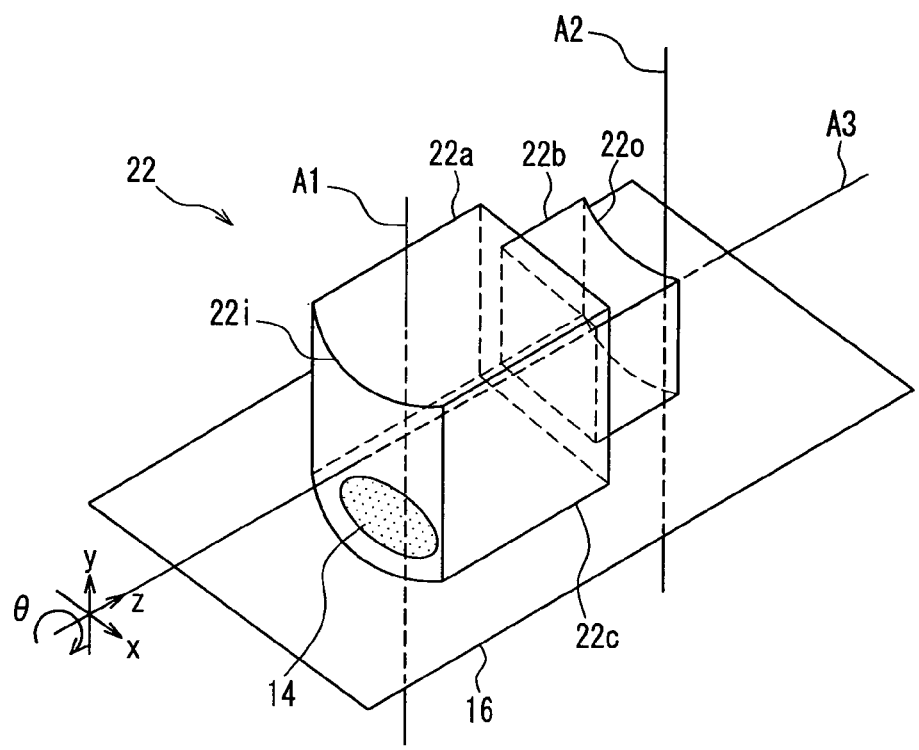
FIG. 5 is a perspective view of a beam-shaping lens according to Embodiment 2 of the present invention.

FIGS. 4A and 4B show an optical head 29 according to Embodiment 2 of the present invention. What is different from Embodiment 1 is that the beam-shaping lens 22 is made of a cylindrical lens 22a and a cylindrical lens 22b. Other configurational aspects are the same as in Embodiment 1, so that further explanations thereof have been omitted. FIG. 5 is a perspective view of the beam-shaping lens 22.

Conventionally, axial rotation symmetry has been employed for lens fabrication, so that it was not necessary to perform a rotation adjustment of the front and rear face of the lens. However, in lenses without axial rotation symmetry, such as the beam-shaping lens 2 of Embodiment 1, it is necessary to keep in mind the rotation error of the two surfaces. When the beam-shaping magnifying power is about a factor of 2, then the aberrations due to rotation error become large. Therefore, the tolerable rotation error is strict at less than 0.05 degrees. In Embodiment 2, the beam-shaping lens 22 is partitioned in two, namely into a cylindrical lens 22a and a cylindrical lens 22b, so that the lens fabrication is as easy as that with a regular cylindrical lens.

Figure 17:
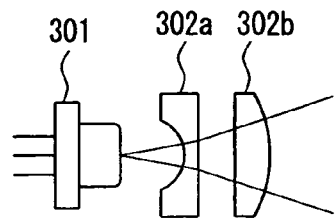
FIG. 17 is a diagrammatic view illustrating a cylindrical lens according to a second conventional example.

The difference from the second conventional example, which was explained with reference to FIG. 17, is that the cylindrical lens 22a and the cylindrical lens 22b are joined together. In the second conventional example, the two cylindrical lenses 302a and 302b are spatially separated, so that the spacing between them fluctuated due to temperature changes, and there was the problem that there were changes in the beam-shaping magnifying power and the aberrations.

In Embodiment 2, the cylindrical lens 22a and the cylindrical lens 22b are joined together by an adhesive, so that the thickness variations due to temperature changes of the adhesive, which is a thin film, can be ignored, and changes in the beam-shaping magnifying power and aberrations do not occur. That is to say, a beam-shaping lens 22 is attained that is stable with respect to environmental changes.

By partitioning the beam-shaping lens 22 into two, in order to make the center axes A1 and A2 of the cylindrical surfaces of the first surface 22i and the second surface 22o parallel and let them intersect with the optical axis A3, it becomes necessary to measure the wave front with an interferometer and adjust the position of the cylindrical lens 22a and the cylindrical lens 22b in the x-direction and to adjust the rotation angle θ. By making the joined surfaces planar, the positional adjustment and the rotational adjustment become easy. Moreover, if the cylindrical lens 22a and the cylindrical lens 22b differ in size, as in FIG. 5, the fixing to the base 16 can be accomplished with a good fit even when the lenses are slightly askew due the positional adjustment and the rotation adjustment when joined together. As explained below, it is preferable that the cylindrical lens 22a on the side of the light source 1 is larger than the cylindrical lens 22b.

By making the cross-sectional shape of the cylindrical lens 22a in the xy-plane quadrilateral, it is possible to fit the bottom surface 22c of the cylindrical lens 22a in planar contact smoothly onto the base 16, so that the beam-shaping lens 22 can be placed securely. That is to say, rotations θ around the z-axis of the beam-shaping lens 22 are curbed, so that positioning in the beam-shaping direction becomes easier.

Moreover, the beam-shaping lens 22 has to be positioned in the z-direction and the x-direction with respect to the light source 1 in order to achieve the desired aberration properties. Since the bottom surface 22c of the cylindrical lens 22a is fit smoothly with planar contact onto the base 16, there is the advantage that the positional adjustment can be carried out reliably. It should be noted that by making the cylindrical lens 22a relatively thick in the z-direction, the surface area of the bottom surface 22c increases, so that the effect is achieved that the positional adjustment of the beam-shaping lens 22 can be carried out more reliably.

It should be noted that it is also possible to make the cross-sectional shape of the cylindrical lens 22a circular and to fabricate a flat portion (bottom portion 2c) by cutting.

If a UV-curing adhesive 14 is applied between the bottom surface 22c and the base 16, then the beam-shaping lens 22 can be easily fixed by irradiating UV light after adjusting the position of the beam-shaping lens 22. Ordinarily, adhesives may expand or shrink due to temperature changes. As shown in FIG. 5, an adhesive 14 that is applied at the xz-plane (the plane perpendicular to the center axis of the cylindrical surfaces) expands or contracts evenly in the x-direction and the z-direction by temperature changes, so that the beam-shaping lens 22 is not shifted in the x-direction or the z-direction. However, when the adhesive 14 expands or contracts in the y-direction due to temperature changes, the beam-shaping lens 22 may shift in the y-direction. However, when the first surface 22i and the second surface 22o shift only in the y-direction their optical characteristics are not affected at all. Thus, Embodiment 2 of the present invention has the advantage that the optical characteristics are not degraded by environmental changes, such as temperature changes.

Moreover, the optical base on which the optical components are mounted is made of metal or plastic, so that it may expand or contract due to temperature changes. Correspondingly, the distance between the light source 1 and the beam-shaping lens 22 may fluctuate, leading to astigmatism. In Embodiment 2 of the present invention, the cylindrical lens 22a on the light source 1 side is made larger, so that the location where the beam-shaping lens 22 is fixed by the adhesive 14 is on the side of the light source 1 (closer to the first surface 22i). Thus, the distance between the light source 1 and the fixing location of the beam-shaping lens 22 is made short, so that there is little expansion or contraction due to temperature changes, and as a result, the effect is attained that astigmatic fluctuations will be small.

Figure 6:
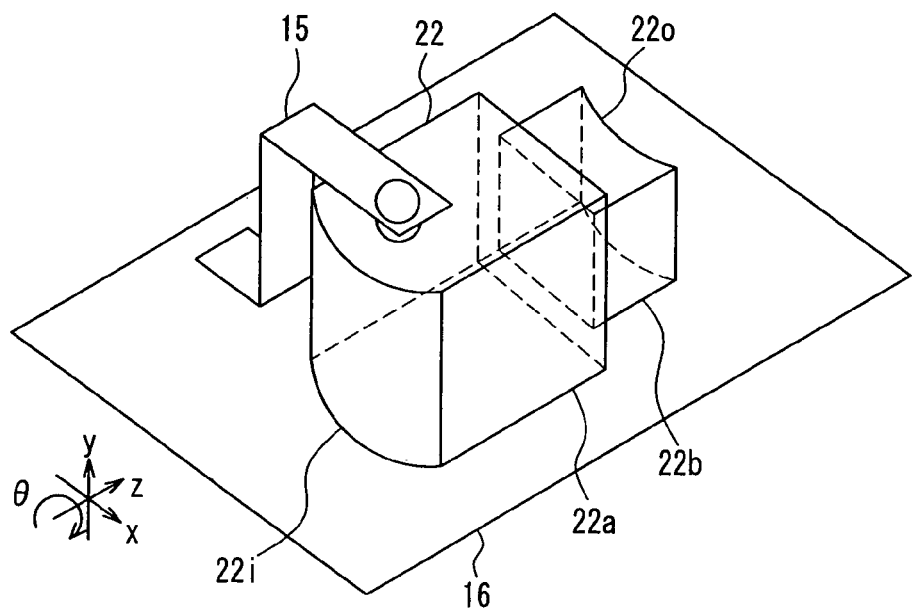
FIG. 6 is a diagram of a spring presser of the beam-shaping lens according to Embodiment 2 of the present invention.

It is also possible to fix the cylindrical lens 22a along the y-direction (center axis direction of the cylindrical surfaces) by pushing it down with a spring 15, as shown in FIG. 6. By pushing it down in the y-direction, the beam-shaping lens 22 will not shift in the x-direction or the z-direction even when the base 16 contracts or expands due to temperature changes, and even when the beam-shaping lens 22 shifts in the y-direction, the first surface 22i and the second surface 22o are shifted only in the y-direction, so that there is the advantageous effect that there are no changes in the optical characteristics. Also in this case, if the location at which the beam-shaping lens 22 is pressed down by the spring 15 is on the side of the light source 1, then the effect is attained that there are few astigmatic fluctuations.

In Embodiment 2 of the present invention, the cylindrical lens 22a and the cylindrical lens 22b are made of glass. The beam-shaping lens 22 itself may also contract or expand due to temperature changes, leading to astigmatism. Glass has a smaller thermal expansion coefficient than plastic, so that it has the advantage that aberration fluctuations due to temperature changes can be kept small.

Embodiment 3

Figure 7A:
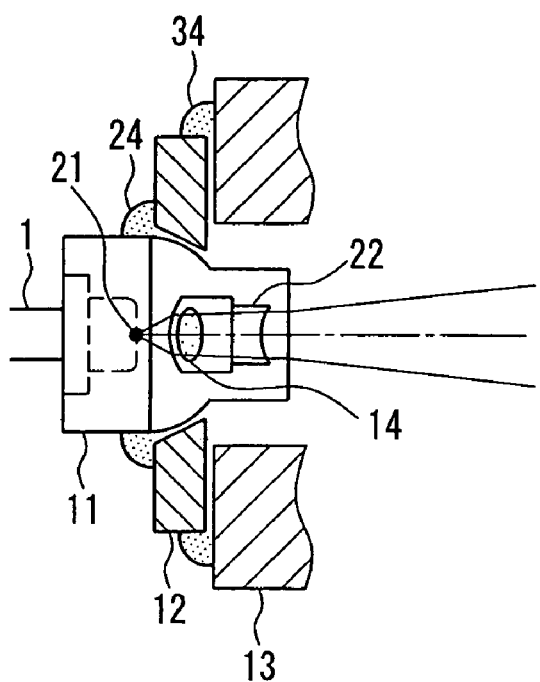
FIG. 7 shows diagrams illustrating the mounting of a beam-shaping lens according to Embodiment 3 of the present invention.
Figure 7B:
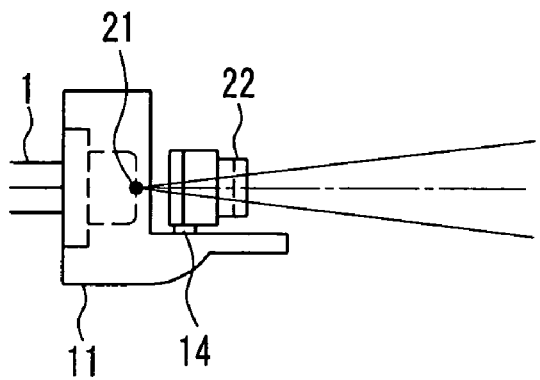

FIGS. 7A and 7B illustrate Embodiment 3 of the present invention, and show a light source 1, a beam-shaping lens 22 and peripheral parts thereof. Other aspects are the same as in Embodiment 1, so that further explanations thereof have been omitted. The details of the beam-shaping lens 22 are the same as described in Embodiment 1 or Embodiment 2.

Generally, due to errors in fabricating the light source 1, the light emission point 21 is misaligned by about 0.1 mm, and the optical axis is tilted by about 3°. In order to correct this, it is necessary to perform a positional adjustment and a tilt adjustment of the light source 1. As shown in FIG. 7A, the light source 1 is fixed to a holder 11 by press-fitting or caulking or the like. The holder 11 can be subjected to a tilt adjustment with respect to an adjustment plate 12, so as to correct the optical axis inclination of the light source 1. The adjustment plate 12 can be subjected to a positional adjustment with respect to the optical base 13 on which the optical components are mounted, so as to correct the misalignment of the light emission point 21 of the light source 1. After the tilt adjustment and the positional adjustment of the light source 1, the holder 11, the adjustment plate 12 and the optical base 13 are fixed by an adhesive 24 and an adhesive 34.

FIG. 7B is a lateral view of the holder 11. It is necessary to adjust the positional relation of the light source 1 and the beam-shaping lens 22 exactly, and it is preferable that the positional fluctuations are small when temperature changes occur after the adjustment. When the light source 1 and the beam-shaping lens 22 are held by separate holders, and both are adhered, then there is the problem that the distance between the holders tends to fluctuate due to temperature differences. In Embodiment 3 of the present invention, the beam-shaping lens 22 and the light source 1 are mounted onto a holder 11, which is a single, unitary member, so that the configuration is simple, resulting in the effect that positional fluctuations with regard to environmental changes are small, and superior aberration characteristics can be maintained.

Figure 8:
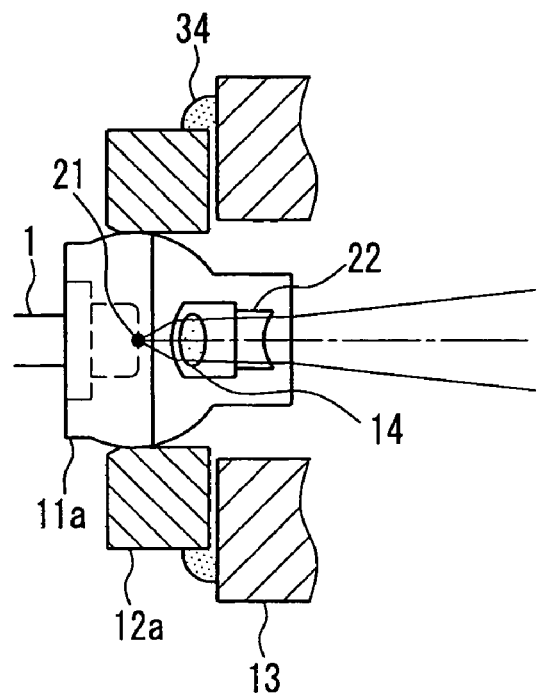
FIG. 8 is a diagram illustrating the mounting of a beam-shaping lens according to Embodiment 3 of the present invention.

FIG. 8 illustrates the case in which a holder 11a on which the light source 1 and the beam-shaping lens 22 are mounted is press-fitted to an adjustment plate 12a after the tilt adjustment. The adhesive 24 in FIG. 7 is inserted into the gap between the holder 11 and the adjustment plate 12 for the tilt adjustment structure, and expansions and contractions and positional fluctuations of the light emission point 21 tend to occur due to temperature changes. The influence of expansions and contractions of the adhesives are eliminated due to the press-fitting, as shown in FIG. 8, so that a more stable performance can be maintained. It should be noted that instead of press-fitting, it is also possible to use caulking or welding.

Embodiment 4

Figure 9:
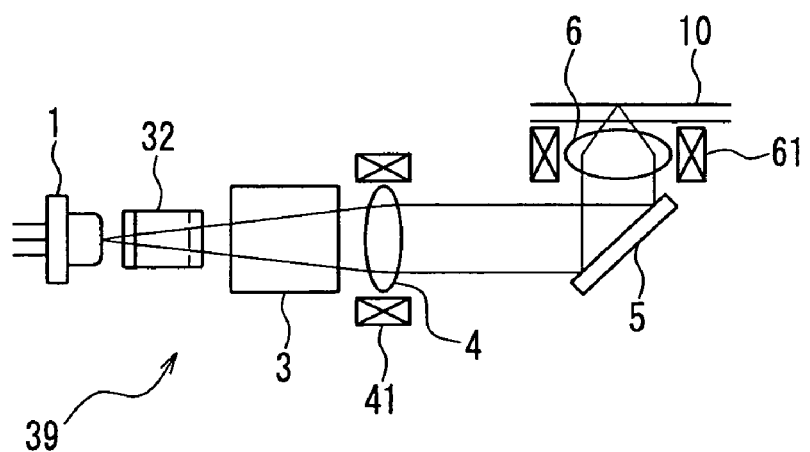
FIG. 9 is a diagrammatic view showing the configuration of an optical head according to Embodiment 4 of the present invention.

FIG. 9 illustrates an optical head 39 according to Embodiment 4 of the present invention. The beam-shaping lens 32 is as explained in Embodiment 1 or Embodiment 2, and the collimating lens 4 can be shifted in the optical axis direction by a spherical aberration correction actuator 41.

Ordinarily, when there are errors in the thickness of the protective layer of the optical disk 10, spherical aberration occurs. It is possible to cancel this spherical aberration with a spherical aberration that occurs by making the beam that is incident on the objective lens 6 slightly divergent or slightly convergent.

Figure 19:
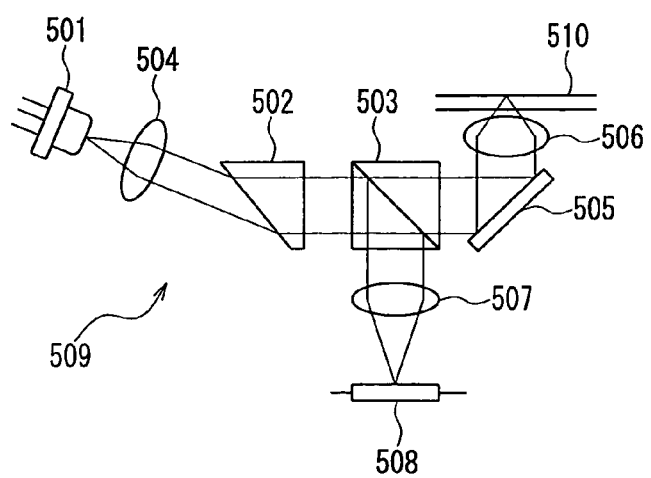
FIG. 19 is a diagrammatic view illustrating an optical head according to a fourth conventional example.

In the fourth conventional example, after the beam has been made parallel with the collimating lens 504, the beam was shaped with the beam-shaping prism 502, as shown in FIG. 19. With such an optical head 509, when the collimating lens 504 is shifted in order to correct the spherical aberration due to thickness errors of the protective layer of the optical disk 510, the beam diverges or converges, so that astigmatism occurs when it passes through the beam-shaping prism 502. That is to say, correcting the spherical aberration is difficult. In Embodiment 4, beam-shaping is performed with a beam-shaping lens 32 in front of the collimating lens 4, so that spherical aberration can be corrected by shifting the collimating lens 4 in optical axis direction. Thus, by using a beam-shaping lens 32 with superior aberration properties that is also stable against environmental changes, a spherical aberration correction becomes first possible with the collimating lens 4. Moreover, only the spherical aberration correction actuator 41 is added, so that there is also the advantageous effect that the costs are minimized.

Embodiment 5

Figure 10:
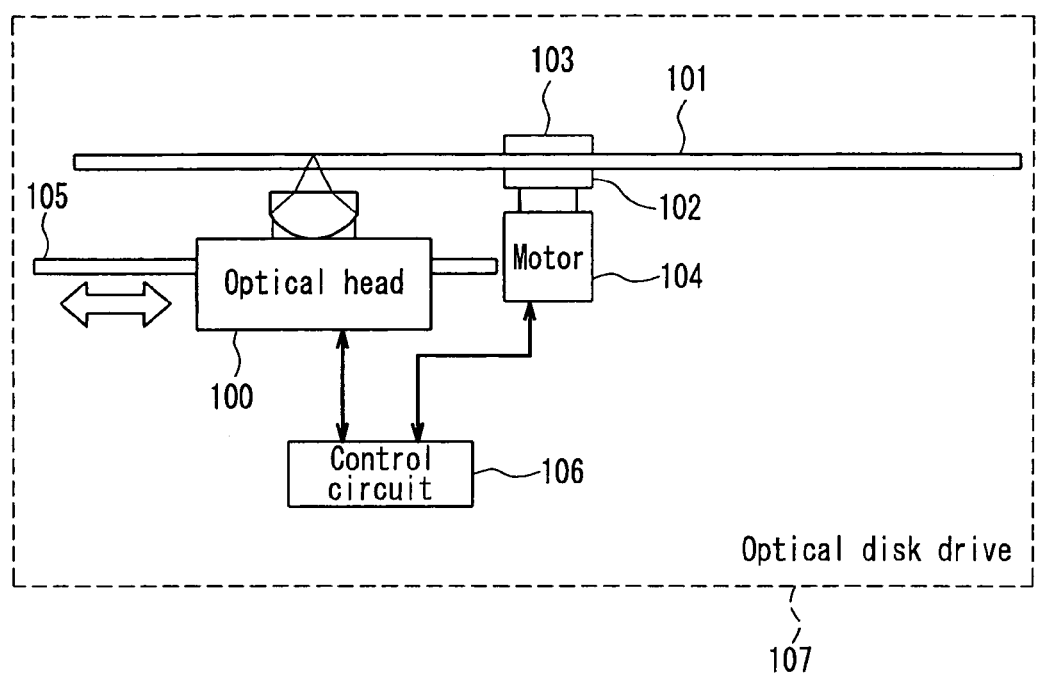
FIG. 10 is a diagrammatic view of an optical disk drive using an optical head according to the present invention.

FIG. 10 shows an example of the overall configuration of an optical disk drive 107 serving as an optical information recording/reproducing apparatus. An optical disk 101 is fixed by clamping it between a turntable 102 and a damper 103, and is rotated by a motor (rotation system) 104. An optical head 100 described in any of Embodiment 1 to Embodiment 4 is carried by a traverse (transport system) 105, such that the irradiated light can be moved from the inner circumference to the outer circumference of the optical disk 101. A control circuit 106 performs the focus control, the tracking control, the traverse control and the motor rotation control based on the signals received from the optical head 100. Moreover, it reproduces the information from the reproduction signal and sends the recording signals to the optical head 100.

Embodiment 6

Figure 11:
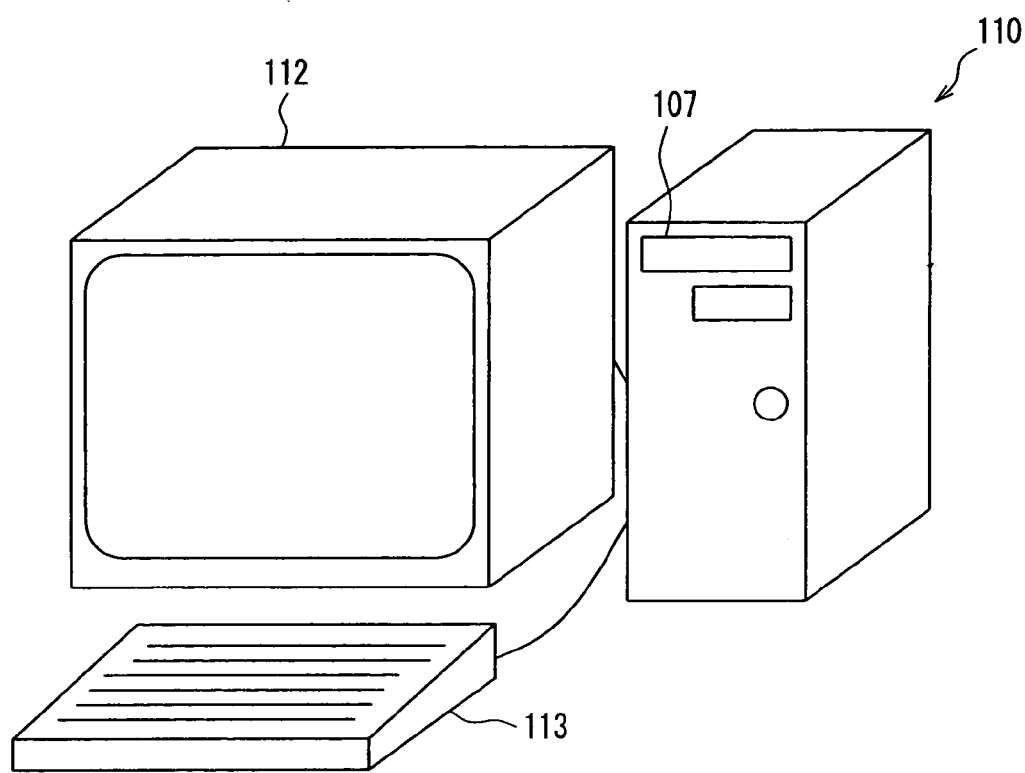
FIG. 11 is an outside view of a personal computer using an optical disk drive according to the present invention.

FIG. 11 shows an embodiment of a computer including an optical disk drive (optical information recording/reproducing apparatus) according to Embodiment 5.

In FIG. 11, a personal computer 110 is provided with an optical disk drive 107 according to Embodiment 5, a keyboard 113 for inputting information, and a monitor 112 for displaying information.

A computer provided with the optical disk drive of the above-described Embodiment 5 as an external storage device can record or reproduce information on different types of optical disks reliably, and can be used for a wide variety of applications. Taking advantage of the large capacity of optical disk drives, they can be used for backing up computer hard disks, and taking advantage of the fact that their media (optical disks) are inexpensive and easily portable, as well as their compatibility, which makes it possible to read out the information with other optical disk drives, it is possible to exchange programs or data with other people, or to carry around one's own programs or data. Moreover, it is possible to adapt the optical disk drive to the reproduction/recording of existing media, such as DVDs or CDs.

Embodiment 7

Figure 12:
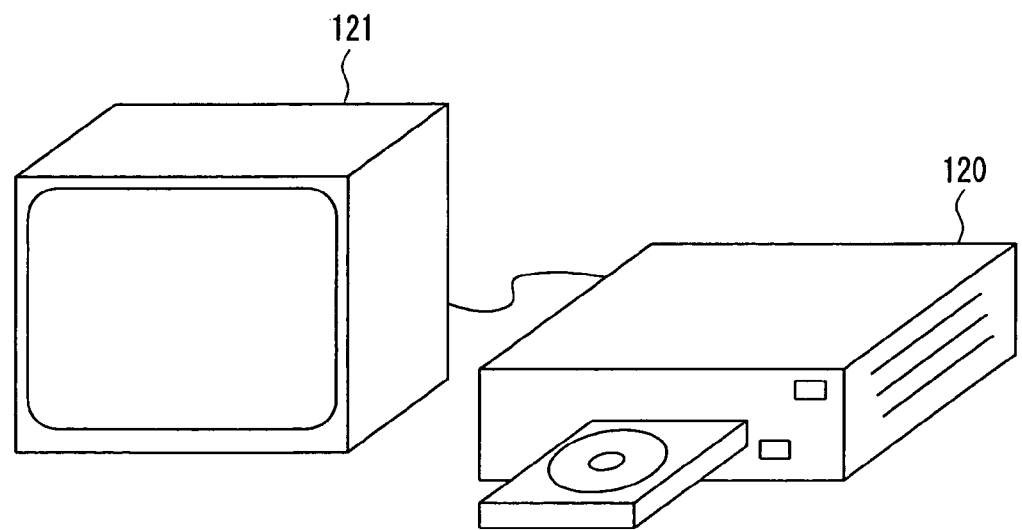
FIG. 12 is an outside view of an optical disk recorder using an optical disk drive according to the present invention.

FIG. 12 shows an embodiment of an optical disk recorder (video recording/reproducing apparatus) provided with the optical disk drive (optical information recording/reproducing apparatus) according to Embodiment 5.

In FIG. 12, the optical disk recorder 120 has a built-in optical disk drive 107 (not shown in the drawings) according to Embodiment 5, and is used in connection with a monitor 121 for displaying recorded video images.

The optical disk recorder 120 provided with the optical disk drive 107 of Embodiment 5 can record or reproduce video images on different types of optical disks reliably, and can be used for a wide variety of applications. The optical disk recorder can record video images onto media (optical disks), and can reproduce the same at any time. Optical disks do not need to be rewound after recording or playing them, like tapes, and they allow time-slip playback in which the beginning of a program is reproduced while recording that program, or simultaneous recording and playback, in which a previously recorded program is reproduced while recording another program. Taking advantage of the fact that the recording media are inexpensive and easily portable, as well as their compatibility, which makes it possible to read out the information with other optical disk recorders, it is possible to exchange videos with other people, or to carry around one's own videos. Moreover, it is possible to adapt the optical disk recorder to the reproduction/recording of existing media, such as DVDs or CDs.

It should be noted that here a case was described in which only an optical disk drive is provided, but it is also possible to provide a built-in hard disk, or a built-in video-tape recording/reproducing function. In this case it becomes easy to save or backup video images temporarily.

Embodiment 8

Figure 13:
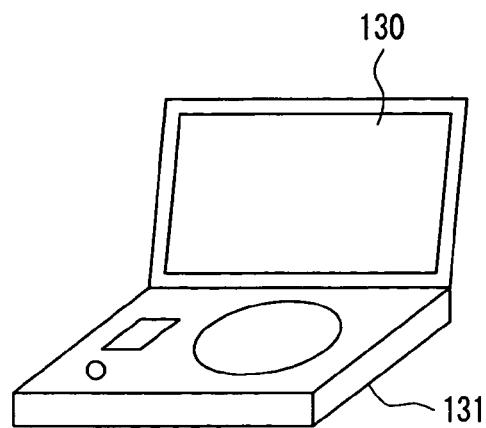
FIG. 13 is an outside view of an optical disk player using an optical disk drive according to the present invention.

FIG. 13 shows an embodiment of an optical disk player (video reproduction apparatus) provided with an optical disk drive (optical information recording/reproduction apparatus) according to Embodiment 5.

In FIG. 13, an optical disk player 131 provided with a liquid crystal monitor 130 has a built-in optical disk drive 107 according to Embodiment 5 (not shown in the drawings), and can display video images recorded on an optical disk with the liquid crystal monitor 130. The optical disk player provided with the optical disk drive 107 of Embodiment 5 can reproduce video images of different types of optical disks reliably, and can be used for a wide variety of applications.

The optical disk player can reproduce the images recorded on media (optical disks) at any time. Optical disks do not need to be rewound after playing them, like tapes, and video images can be accessed and reproduced for any location. Moreover, it is possible to adapt the optical disk player to the reproduction/recording of existing media, such as DVDs or CDs.

Embodiment 9

Figure 14:
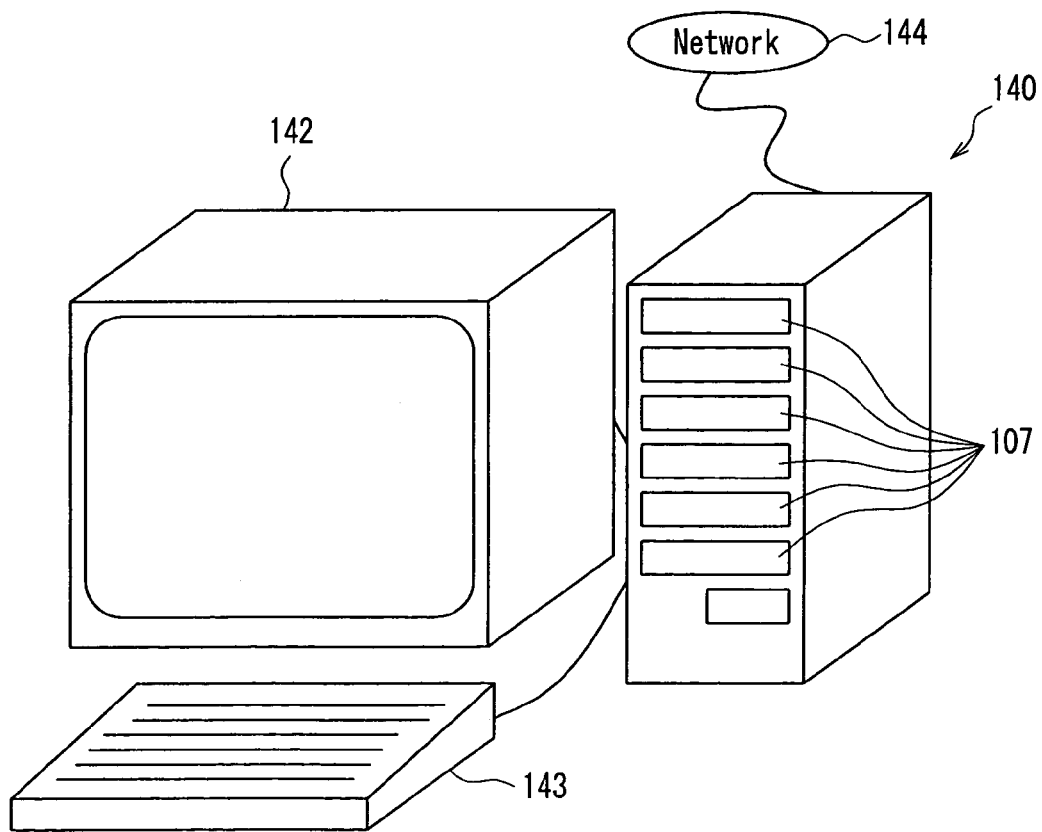
FIG. 14 is an outside view of a server using an optical disk drive according to the present invention.

FIG. 14 shows an embodiment of an embodiment of a server provided with an optical disk drive (optical information recording/reproducing apparatus) according to Embodiment 5.

In FIG. 14, a server 140 is provided with optical disk drives 107 according to Embodiment 5, a monitor 142 for displaying information, and a keyboard 143 for entering information, and is connected to a network 144.

The server, which is provided with the optical disk drives 107 according to Embodiment 5 as an external storage apparatus, can record or reproduce video information on different types of optical disks reliably, and can be used for a wide variety of applications. Taking advantage of their large capacity, the optical disk drives can send information (images, audio, video, HTML documents, text documents, etc.) recorded on optical disks in response to requests from the network 144. Moreover, information sent from the network can be recorded at the requested location. Moreover, it is possible to reproduce information recorded on existing media, such as DVDs or CDs, so that it is also possible to send the information thereon.

Embodiment 10

Figure 15:
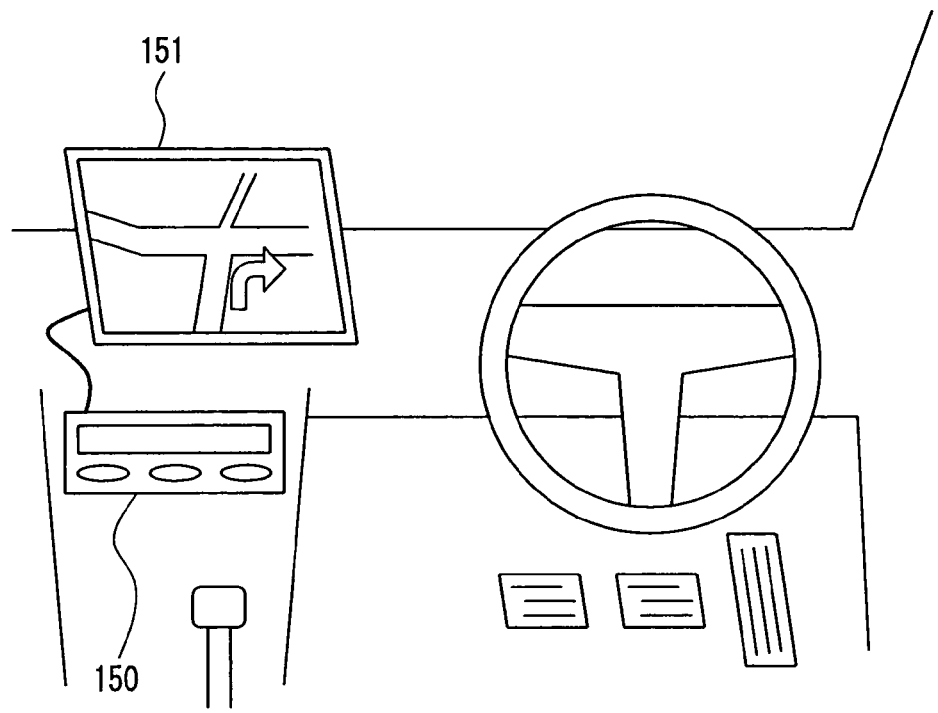
FIG. 15 is an outside view of a car navigation system using an optical disk drive according to the present invention.

FIG. 15 shows an embodiment of a car navigation system provided with an optical disk drive (optical information recording/reproducing apparatus) according to Embodiment 5.

The car navigation system 150 in FIG. 15 has a built-in optical disk drive 107 according to Embodiment 5 (not shown in FIG. 15), and is used in connection with a liquid crystal monitor 151 for displaying geographical and route information.

The car navigation system, which is provided with the optical disk drive 107 according to Embodiment 5, can record or reproduce video information on different types of optical disks reliably, and can be used for a wide variety of applications. Based on the map information recorded on the recording medium (optical disk) as well as information from GPS (global positioning system), gyroscope, speedometer and distance meter, the car navigation system 150 calculates the current position and displays that position on the liquid crystal monitor. When entering the destination, it calculates the optimum route to the destination based on the map information and road information, and displays it on the liquid crystal monitor.

Using an optical disk of large capacity for recording the map information, it is possible to provide detailed road information covering a wide area on a single disk. It is also possible to store on the disk further information about road-side amenities, such as restaurants, convenience stores or gas stations. The road information may become outdated, but since the optical disk has compatibility and is an inexpensive medium, it is possible to acquire the newest information by exchanging the disk with one storing the newest road information. Moreover, the car navigation system can be adapted to the reproduction/recording of existing media, such as DVDs or CDs, so that it is also possible to view videos or listening to music in the car.

The present invention can be applied to optical heads, optical information recording/reproducing apparatuses that record or reproduce information by irradiating light from an optical head onto an optical disk, as well as computers, video recording/reproducing apparatuses, video reproducing apparatuses, servers and car navigation systems using the same.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head, comprising:
   a light source;
   a beam-shaping lens shaping an elliptical divergent beam that is emitted from the light source into a substantially circular divergent beam;
   a collimating lens that converts the substantially circular divergent beam into a substantially parallel beam;
   an objective lens that focuses the substantially parallel beam onto an optical information recording medium; and
   a detector that detects a beam that is reflected from the optical information recording medium;
   wherein the beam-shaping lens has a pair of cylindrical surfaces that are curved in the same direction;
   wherein one of the pair of cylindrical surfaces is an aspherical surface, and the other one of the pair of cylindrical surfaces is a spherical surface; and
   wherein the cylindrical surface that is closer to the light source is the aspherical surface, and the cylindrical surface that is further away from the light source is the spherical surface.

2. The optical head according to claim 1, wherein a cross-section of the beam-shaping lens perpendicular to an optical axis of the beam-shaping lens is of quadrilateral shape.

3. The optical head according to claim 1, wherein the beam-shaping lens is made of glass.

4. The optical head according to claim 1, wherein the beam-shaping lens is mounted on a base and a location at which the beam-shaping lens is fixed to the base is closer to the light source with respect to a center of the beam-shaping lens.

5. The optical head according to claim 1, wherein the beam-shaping lens is adhered to a base at a surface that is perpendicular to center axes of the cylindrical surfaces of the beam-shaping lens.

6. The optical head according to claim 1, wherein the beam-shaping lens and a base on which the beam-shaping lens is mounted are pressed together by a spring that exerts pressure in a center axis direction of the cylindrical surfaces of the beam-shaping lens.

7. The optical head according to claim 1, wherein the beam-shaping lens is made of two cylindrical lenses, which are joined together.

8. The optical head according to claim 7, wherein the two cylindrical lenses have planar surfaces where the two cylindrical lenses are joined together.

9. The optical head according to claim 7, wherein cross sections perpendicular to an optical axis of the two cylindrical lenses are of different size.

10. The optical head according to claim 9, wherein the cross section perpendicular to the optical axes of the two cylindrical lenses that are closer to the light source is larger than that of the cylindrical lens that is further away from the light source.

11. The optical head according to claim 7, wherein the two cylindrical, lenses have different thicknesses in an optical axis direction.

12. The optical head according to claim 11, wherein the thickness in the optical axis direction of the cylindrical lens that is closer to the light source is larger than that of the cylindrical lens that is farther away from the light source.

13. The optical head according to claim 1, wherein the light source and the beam-shaping lens axe fixed to the same holder.

14. The optical head according to claim 13, wherein the holder has a tilt adjustment mechanism for correcting an optical axis tilt of the light source.

15. The optical head according to claim 13, wherein the holder has a positional adjustment mechanism for correcting a positional error of the light source.

16. The optical head according to claim 13, wherein the holder is press-fitted to an optical base of the optical head.

17. The optical head according to claim 13, wherein the holder is fixed to an optical base of the optical head by caulking.

18. The optical head according to claim 13, wherein the holder is welded to an optical base of the optical head.

19. The optical head according to claim 1, wherein the collimating lens can be moved in optical axis direction.

20. An optical information recording/reproducing apparatus, comprising:
the optical head according to claim 1;
a rotation system or a transport system that moves the optical head relative to the optical information recording medium; and
a control circuit that controls the optical head and the rotation system and transport system based on signals obtained with the optical head.

21. A computer comprising the optical information recording/reproducing system according to claim 20 as an external storage apparatus.

22. A video recording/reproducing apparatus that can record or reproduce video images on an optical information recording medium, the video recording/reproducing apparatus comprising the optical information recording/reproducing apparatus according to claim 20.

23. A video reproducing apparatus that can reproduce video images from an optical information recording medium, the video reproducing apparatus comprising the optical information recording/reproducing apparatus according to claim 20.

24. A server comprising the optical information recording/reproducing system according to claim 20 as an external storage apparatus.

25. A car navigation system comprising the optical information recording/reproducing system according to claim 20 as an external storage apparatus.

26. An optical head, comprising:
a light source;
a beam-shaping lens shaping an elliptical divergent beam that is emitted from the light source into a substantially circular divergent beam, mounted on a base;
a collimating lens that converts the substantially circular divergent beam into a substantially parallel beam;
an objective lens that focuses the substantially parallel beam onto an optical information recording medium; and
a detector that detects a beam that is reflected from the optical information recording medium;
wherein a location at which the beam-shaping lens is fixed to the base is on a surface of the beam-shaping lens that extends along an optical axis of the beam-shaping lens and closer to the light source with respect to a center of the beam-shaping lens.

27. The optical head according to claim 26, further comprising an adhesive that is applied on the side of the bean-shaping lens that is closer to the light source, in order to adhere the beam-shaping lens to the base.

28. The optical head according to claim 21, further comprising an elastic member that presses the beam-shaping lens down, on the side of the beam-shaping lens that is closer to the light source.

29. The optical head according to claim 26, wherein the base has a protruding shape with respect to the beam-shaping lens on the side that is closer to the light source.

30. The optical head according to claim 26, wherein the base has a depressed shape with respect to the beam-shaping lens between the side that is closer to the light source and the side that is further away from the light source.

31. A beam-shaping lens that shapes an elliptical divergent beam that is emitted from a semiconductor laser light source into a substantially circular divergent beam, the beam-shaping lens comprising:
a pair of cylindrical surfaces that are curved in the same direction,
wherein one of the pair of cylindrical surfaces is art aspherical surface, and the other one of the pair of cylindrical surfaces is a spherical surface, and
wherein the cylindrical surface tat is closer to the semiconductor laser light source is the aspherical surface, and the cylindrical surface that is further away from the semiconductor laser light source is the spherical surface.

32. The beam-shaping lens according to claim 31, being made of glass.

33. The beam-shaping lens according to claim 31, wherein the cylindrical surface that is closer to the semiconductor laser light source is convex.

34. The beam-shaping lens according to claim 31, comprising a plane perpendicular to a center axis of the pair of cylindrical surfaces.

35. The bean-shaping lens according to claim 31, wherein a ratio between a short axis and a long axis of the substantially circular divergent beam after being shaped is in a range from 1:1 to 1:2.

* * * * *